(12) United States Patent
Meissner et al.

(10) Patent No.: US 7,309,464 B2
(45) Date of Patent: Dec. 18, 2007

(54) STEERABLE MAGNETIC WHEEL CARRIAGE

(76) Inventors: Marty Meissner, 84349 Hwy. 339, Milton-Freewater, OR (US) 97862; Jerry Bobbitt, 1319 SE. Larch Ave., College Place, WA (US) 99324-1722

( * ) Notice: Subject to any disclaimer, the term of this patent is extended or adjusted under 35 U.S.C. 154(b) by 418 days.

(21) Appl. No.: 10/910,497

(22) Filed: Aug. 3, 2004

(65) Prior Publication Data

US 2006/0027952 A1 Feb. 9, 2006

(51) Int. Cl.
*B23K 7/10* (2006.01)

(52) U.S. Cl. .............................. 266/66; 266/73; 266/56

(58) Field of Classification Search .................. 266/48, 266/56, 66, 73
See application file for complete search history.

(56) References Cited

U.S. PATENT DOCUMENTS

| | | | |
|---|---|---|---|
| 4,014,528 A | 3/1977 | Sugiyama et al. | 266/66 |
| 4,995,320 A * | 2/1991 | Sato et al. | 104/118 |
| 5,265,849 A | 11/1993 | Yamashita | 266/77 |
| 5,853,655 A | 12/1998 | Baker | 266/44 |
| 6,596,222 B2 * | 7/2003 | Reilly et al. | 266/67 |
| 6,627,004 B1 * | 9/2003 | Lockhart | 266/73 |

\* cited by examiner

*Primary Examiner*—Scott Kastler
(74) *Attorney, Agent, or Firm*—Floyd E. Ivey; Liebler, Ivey, Connor, Berry & St. Hilaire

(57) ABSTRACT

A lightweight remote controlled carriage apparatus having a frame means composed of a first frame member and a second frame member interconnected by a transverse frame member having a transverse frame member axis; the transverse frame member having a pivot point intermediate a first transverse frame member end and a second transverse frame member end allowing rotation or pivoting, about the axis, of the first frame member relative to the second frame member. Wheel frame means extending orthogonally from the first frame member and the second frame member toward a surface. The wheel frame means receiving remotely controlled motor driven magnetic wheels. The magnetic wheels having a middle plate having at least one magnet on at least one side received into a recessed pocket; at least one outer plate on each side of the middle plate. The middle plate having a circumference providing a traction means. Fixture attachment means provides for mounting welding and cutting apparatuses, cameras and other devices to be carried by the carriage.

14 Claims, 12 Drawing Sheets

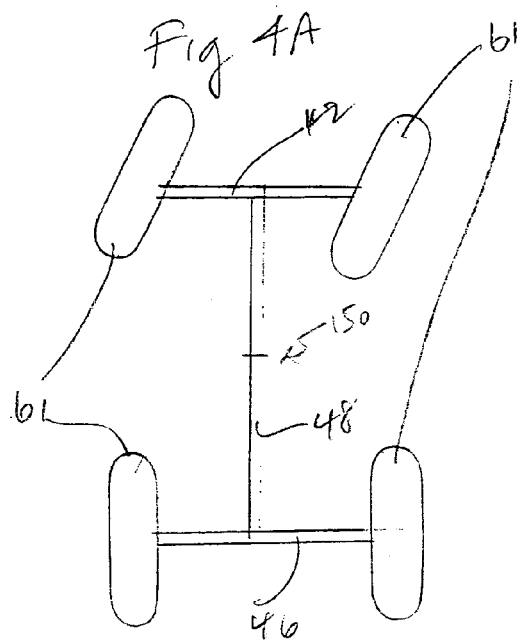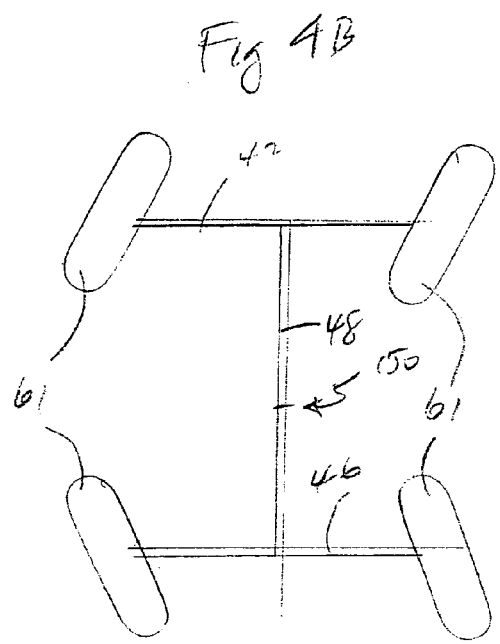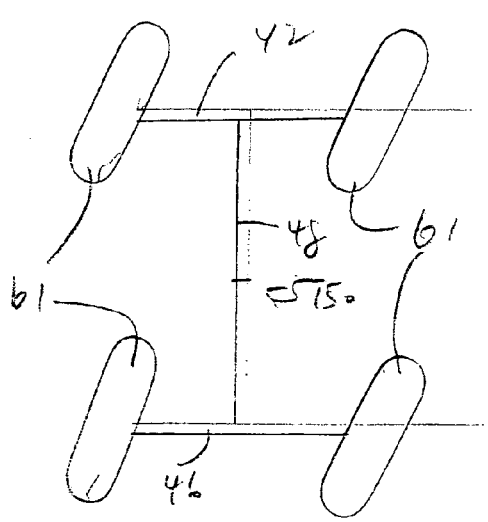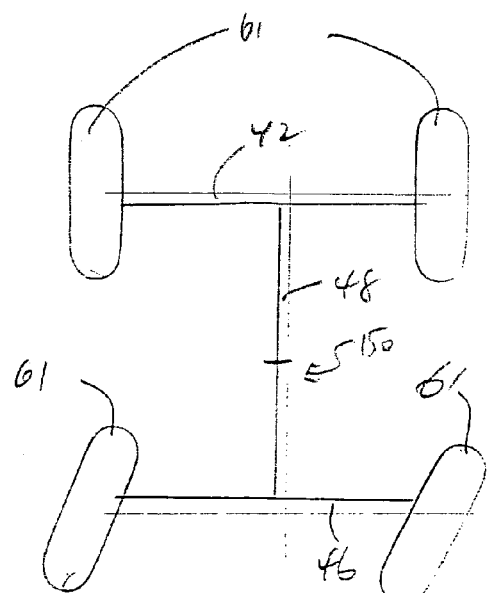

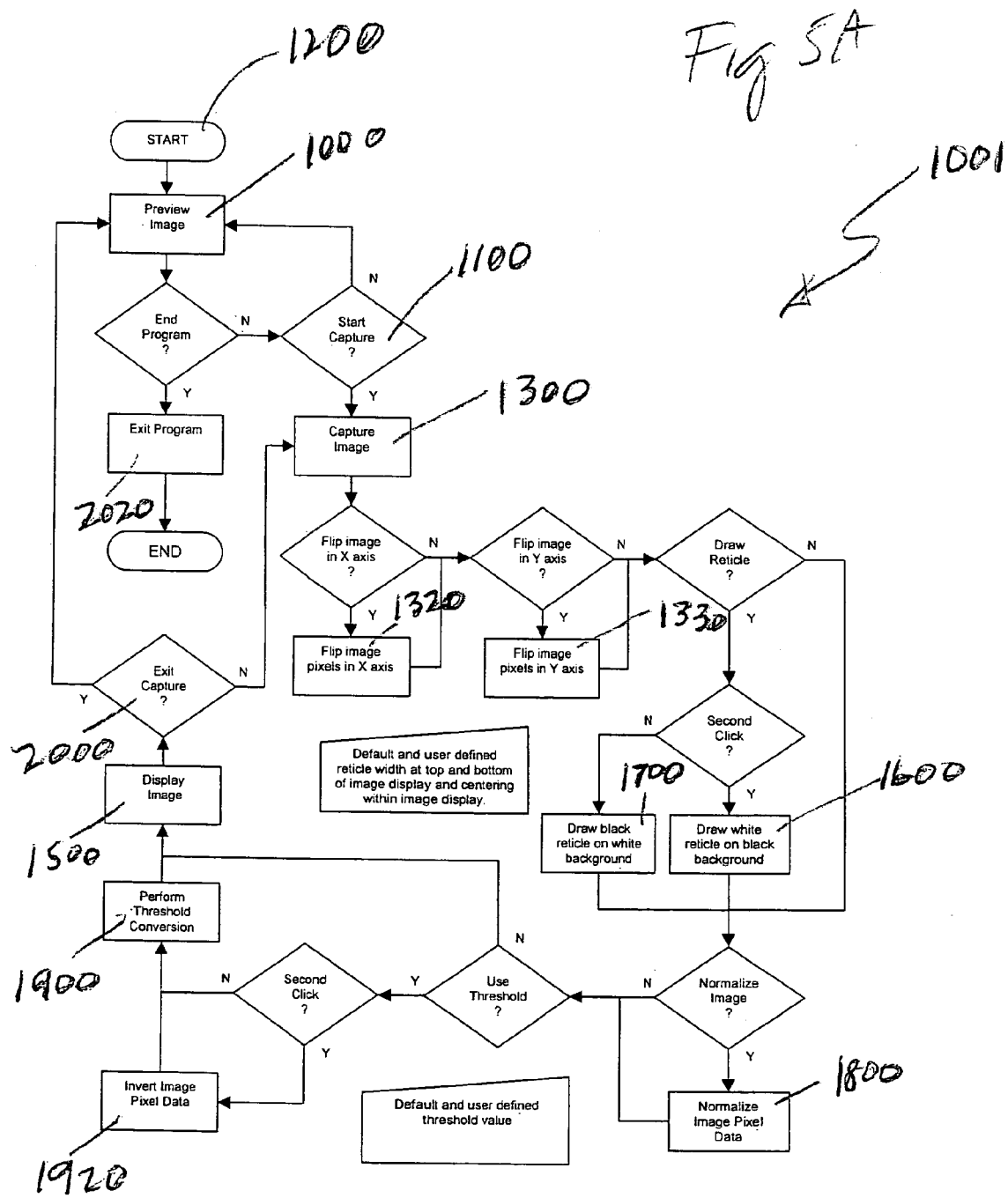

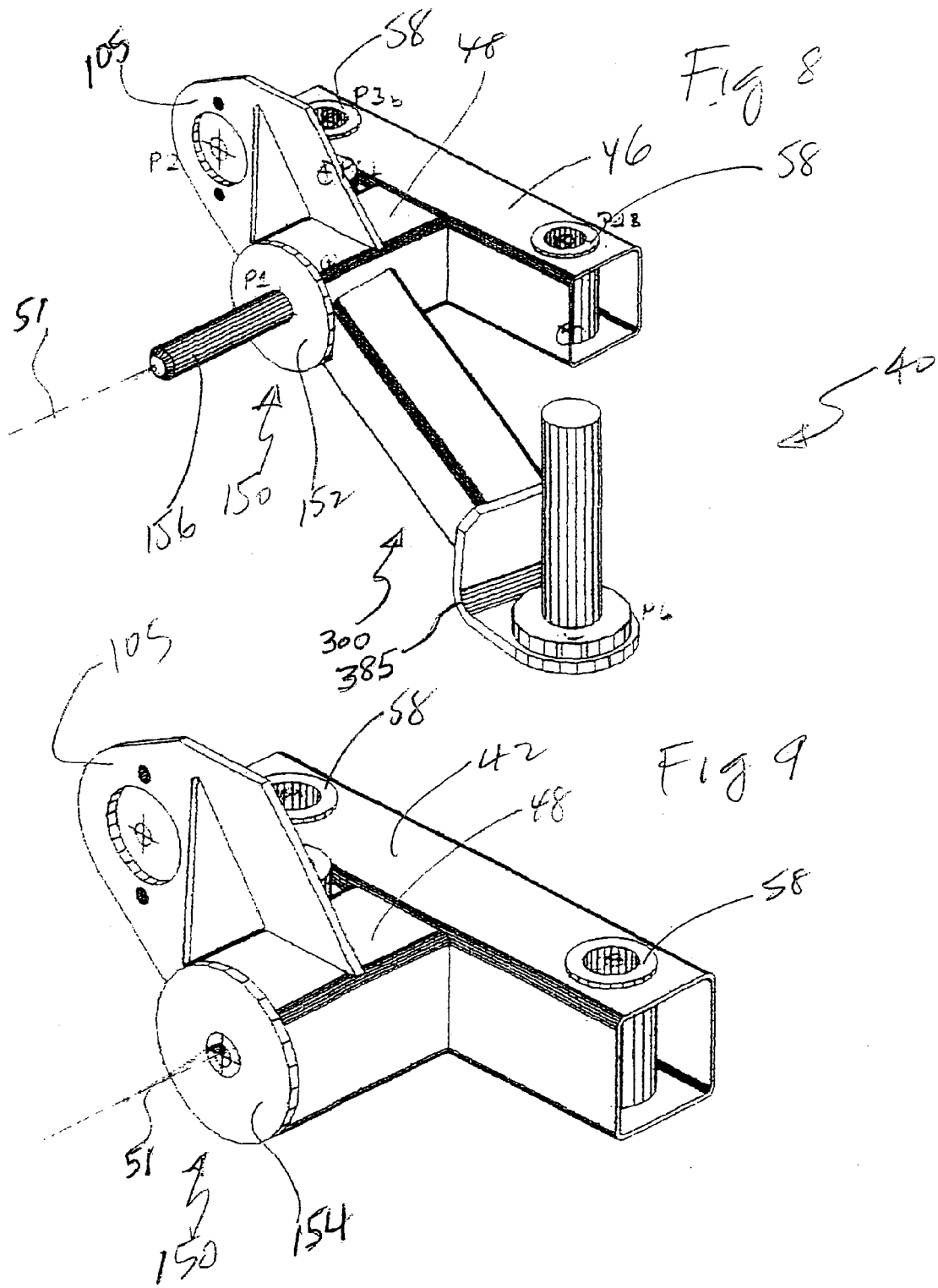

STEERABLE MAGNETIC WHEEL CARRIAGE

FIELD OF THE INVENTION

The present invention relates generally to automated cutting and or welding of ferrous metal including pipe or plate and in particular to the positioning and movement, with camera assisted guidance, of one or a plurality of carriages supporting cutting and or welding means, which transports welding heads and cutting torches and associated gas, electrical or other power sources and positions said welding heads and or cutting torches at the point and along the path or pattern which requires welding and or cutting.

BACKGROUND OF THE INVENTION

Automated welding and or cutting carriages are known in the prior art which transport welding heads and/or cutting torches and related power systems, including gas hoses, power cables and wire feed, following a track, band or mechanical device or devices which requires materials and manufacturing of the device and the expenditure of labor for the installation or affixing to a pipe or along a plate prior to the mounting of a torch or welding system including the following: Bug-O® Systems including a GO-FER III DELUXE KIT with a rack and pinion drive unit which is positioned by magnet plate assemblies; ESAB™ describes a Silhouette 500 Portable Shape Cutter with a rack and pinion drive mechanism for the positioning and movement of torch heads; ESAB™ also describes the SABRE 1000, 2000 or 3000 torch cutting models using a rail positioning system incorporating roller-bearing wheels on machined rail surfaces; H&M® shows pipe cutting and beveling machines where a torch is mounted, positioned and moved by saddle and ring gear; H&M® also demonstrates a band-type guidance machine which follows a stainless steel bands; H&M® as well shows a Model "C" adjustable torch holder featuring two rack-and-pinion driven, dove-tailed slide assemblies permitting horizontal and vertical movements; Victor® discloses a VCM-200 cutting tractor-type machine utilizing track; Koike Aronson, Inc. provides a welding carriage for welding applications with the carriage self-aligning to a joint where a magnet in the carriage provides stability; U.S. patent to Yamashita (assignee Koike) U.S. Pat. No. 5,265,849 discloses a motor driven torch device following an arc rail; U.S. patent to Sugiyama et. al (assignee Koike) U.S. Pat. No. 4,014,528 discloses a hand held motor driven torch; and U.S. Pat. No. 5,853,655 to Baker which discloses a magnetic wheel guided carriage with positioning arm. The magnetic wheels of Baker consisted of eight rare earth magnets between two round plates. This configuration proved unreliable when operations were required on uneven surfaces where one of the wheel outer plate surfaces could break contact with the material the carriage was traveling on, greatly reducing the wheels magnetic attraction to the surface, causing the carriage to fall. The wheels of Baker created approximately seventy lbs. of force. Each of the foregoing are disclosed via an Information Disclosure Statement in accordance with 37 CFR 1.97.

SUMMARY OF THE INVENTION

The present invention composed of an apparatus and process comprises an improvement to automated cutting and or welding systems in that it eliminates the need for and the labor required in the affixing of separate track, band or other mechanical guidance devices which are required for the use of known automated cutting and welding machines and overcomes the obstacles posed by uneven and curved surfaces and inverted operations. This disclosure facilitates cutting and welding in the shop or manufacturing plant site as well as at remote field work sites by eliminating the need for permanently installed cutting or welding systems or systems requiring the location of pedestals in preparation for the cutting or welding of ferrous pipe or plate.

The present invention discloses a carriage which is guided and propelled by a remote controlled multi-motor driven magnetic wheel system. Camera and optical means assists in carriage positioning. The preferred embodiment of the magnetic wheel system will have at least two sets of magnetic wheels or trucks having axle means. In the preferred embodiments the magnetic wheel system will be composed of four magnetic wheels where each independent wheel is interconnected by axle means to a wheel frame means. An alternative embodiment will be composed of at least three magnetic wheels each independently interconnected by axle means to a wheel frame means. The magnet wheels present a flat or convex surface at their perimeter.

The carriage will bear a load, comprised for welding and cutting functions, of one or more positioning arms having means to accept cutting and/or welding heads and camera and optical means. The carriage, or multiple carriages if required, supports the carriage drive and transmission means, implements and materials required for cutting and or welding and positioning arm. Multiple carriages may be utilized wherein more than a single carriage is required to transport cutting and or welding materials. For example, a first carriage may transport an automated positioning arm with welding head and arm drive power means along with additional components and materials associated with the particular welding process with a second carriage transporting, for example, the wire feed material connected to and used by the first carriage welding process. Multiple carriages may also be employed wherein multiple cutting and/or welding operations are conducted simultaneously. The carriage is positioned and transported by the magnetic wheel system to facilitate welding and cutting along a line or pattern on ferrous material including plate or pipe.

A torch or welding head is positioned by carriage tracking or by a combination of carriage tracking and automated positioning arm movement. The carriage movement or tracking is accomplished in particular without the installation of separate track, band or other mechanical guidance devices. A principal advantage to the disclosed magnetic wheel system is the reduction of set up time required for use of automated cutting or welding systems by the elimination of need for installation of carriage guidance jigs, tracks, bands or guides which require positioning and fastening and, in some instances, welding and or cutting for installation. An additional advantage is the elimination of the expense required for the material and manufacturing of such guidance devices. Yet another advantage is the method of positioning the torch or welding head for cutting or welding functions as requiring for positioning 1) only by the scribing of a reference line on the subject plate or pipe where the guidance of the carriage and hence torch or welding head positioning depends solely upon the precision of the tracking provided by the magnetic wheel system assisted by camera or optical means viewing of such a reference line and or 2) the combination of carriage tracking provided by the magnetic wheel system and the movement of a fixture attachment means bearing, for example, welding, cutting and camera or optical means.

A principle advantage of the invention is the ability of the disclosure to allow a carriage to traverse curved and uneven surfaces without such a loss of magnetic attraction as to cause the carriage to fall from the object subject to the manufacturing, welding and or cutting process.

BRIEF DESCRIPTION OF THE DRAWINGS

The foregoing and other features and advantages of the present invention will become more readily appreciated as the same become better understood by reference to the following detailed description of the preferred embodiment of the invention when taken in conjunction with the accompanying drawings, wherein:

FIGS. 4A, 4B, 4C and 4D are schematics illustrating the magnetic wheel (61) and steering configurations of the carriage apparatus (1).

FIG. 5A is a flow diagram of the camera and circuit communication means (445) computer program (1001).

FIGS. 8 and 9 show carriage frame means (40) with first frame member (42), second frame member (46) and transverse frame member (48) with transverse frame member axis (51). Illustrated is the frame pivot (150) having a frame pivot first surface (152), frame pivot second surface (154) and frame pivot connecting shaft (156). Shown is shaft attachment means (56). and motor mount (105).

DETAILED DESCRIPTION

Figure 1:
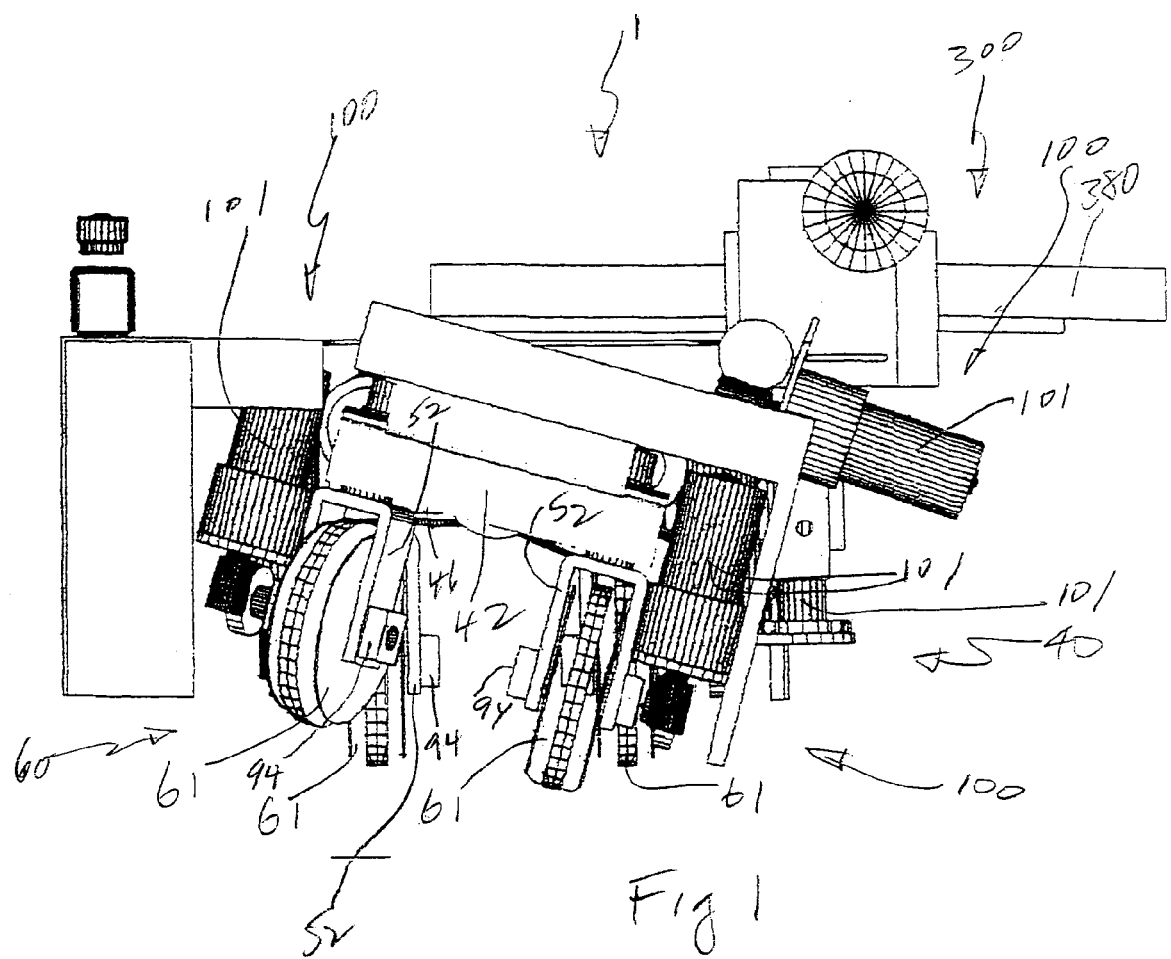
FIG. 1 is a front elevation of the steerable magnetic wheel carriage (1) showing a frame means (40) depicting steerable magnetic wheels (60). Illustrated is the first frame member (42) with wheel frame means (52) having magnetic wheels (61) and wheel mounting means (94) demonstrating the pivotable relationship with a second frame member (46) by the view of the magnetic wheels (61) at the first frame member (42) being rotated or pivoted relative to the magnetic wheels (61) of a second frame member (46).

The preferred embodiment of the steerable magnetic wheel carriage (1) is illustrated in FIGS. 1, 2, 3 and 4. The preferred embodiment of the steerable magnetic wheel carriage (1) has a frame means (40) which places steerable magnetic wheel system (60) in contact with a surface (65) and, in many instances an irregular or curved surface including the surface of a pipe (66). The frame means (40) in the preferred embodiment is comprised of at least one elongated first frame member (42) having at least one wheel frame means (52) extending orthogonally therefrom toward the surface (65). The at least one wheel frame means (52) receiving at least one magnetic wheel (61) rotatably affixed thereto by wheel mounting means (94); at least one elongated second frame member (46) having at least one wheel frame means (52) extending orthogonally therefrom toward the surface (65). The at least one wheel frame means (52) receiving at least one magnetic wheel (61) rotatably affixed thereto by wheel mounting means (94). Wheel mounting means (94) includes axle means and other readily recognized wheel mounting means.

The at least one elongated transverse frame member (48) having a transverse frame member first end (49) and a transverse frame member second end (50) and frame pivot (150); a transverse frame member axis (51) from the transverse frame member first end (49) to the transverse frame member second end (50). The at least one first frame member (42) is rigidly affixed by frame interconnection means to the transverse frame member first end (49); the at least one second frame member (46) is rigidly affixed by frame interconnection means to the transverse frame member second end (50); the said at least one first frame member (42) and the at least one second frame member (46) are interconnected to the at least one transverse frame member (48) such that they are generally parallel to each other.

The at least one elongated transverse frame member (48) has a frame pivot means (150) intermediate the said transverse frame member first end (49) and the transverse frame member second end (50). In the preferred embodiment frame pivot means (150), depicted in FIGS. 3, 4, 8 and 9, causes the transverse frame member first end (49), and hence the at least one first frame member (42), to pivot about the axis (51) relative to the transverse frame member second end (50) and hence the at least one second frame member (46), as the carriage apparatus (1) maneuvers over irregular surfaces (65) including negotiation of the curvature of a pipe (66) thereby insuring continued contact between the magnetic wheels (61) extending from the frame means (40) toward the surface (65). In the preferred embodiment the frame pivot means (150) is comprised of a frame pivot first surface (152) bearing on a frame pivot second surface (154) where the frame pivot first surface (152) and pivot second surface (154) are rotatable interconnected by frame pivot connecting shaft means (156). Those of ordinary skills in the pivot interconnection arts will recognize that other equivalent means will be available to facilitate the pivot relationship between the at least one first frame member (42) and the at least one second frame member (46).

The configuration of the at least one first frame member (42) and the at least one second frame member (46), i.e., relative to being generally parallel to the other, is not controlling so long as the at least one wheel frame means (52) with at least one magnetic wheel (61) extending from each of the at least one first frame member (42) and from the at least one second frame member (46) remain in contact with the surface (65) and are steerable during operation of the invention.

In the preferred embodiment at least two wheel frame means (52) presenting at least one magnetic wheel (61) each will be rotatably affixed to at least one of the at least one first frame member (42) or the at least one second frame member (46) such that there will be at least three magnetic wheels (61) extending from the frame means (40) for contact with the surface (65) or pipe (66).

Frame means (40) will generally be constructed of rigid materials including tubular materials including metals, composite materials and other materials appreciated by those of ordinary skill in the frame arts. Frame interconnection means will include but not be limited to welding and other mechanical affixing means and by adhesives including epoxies.

Wheel frame (52) is rotatably interconnected with the at least one first frame member (42) and the at least one second frame member (46) by rotatable shaft attachment means (56) composed, in the preferred embodiment, of a shaft received by bushing and bearing means positioned in the at least one first frame member (42) and in the at least one second frame member (46).

Figure 3:
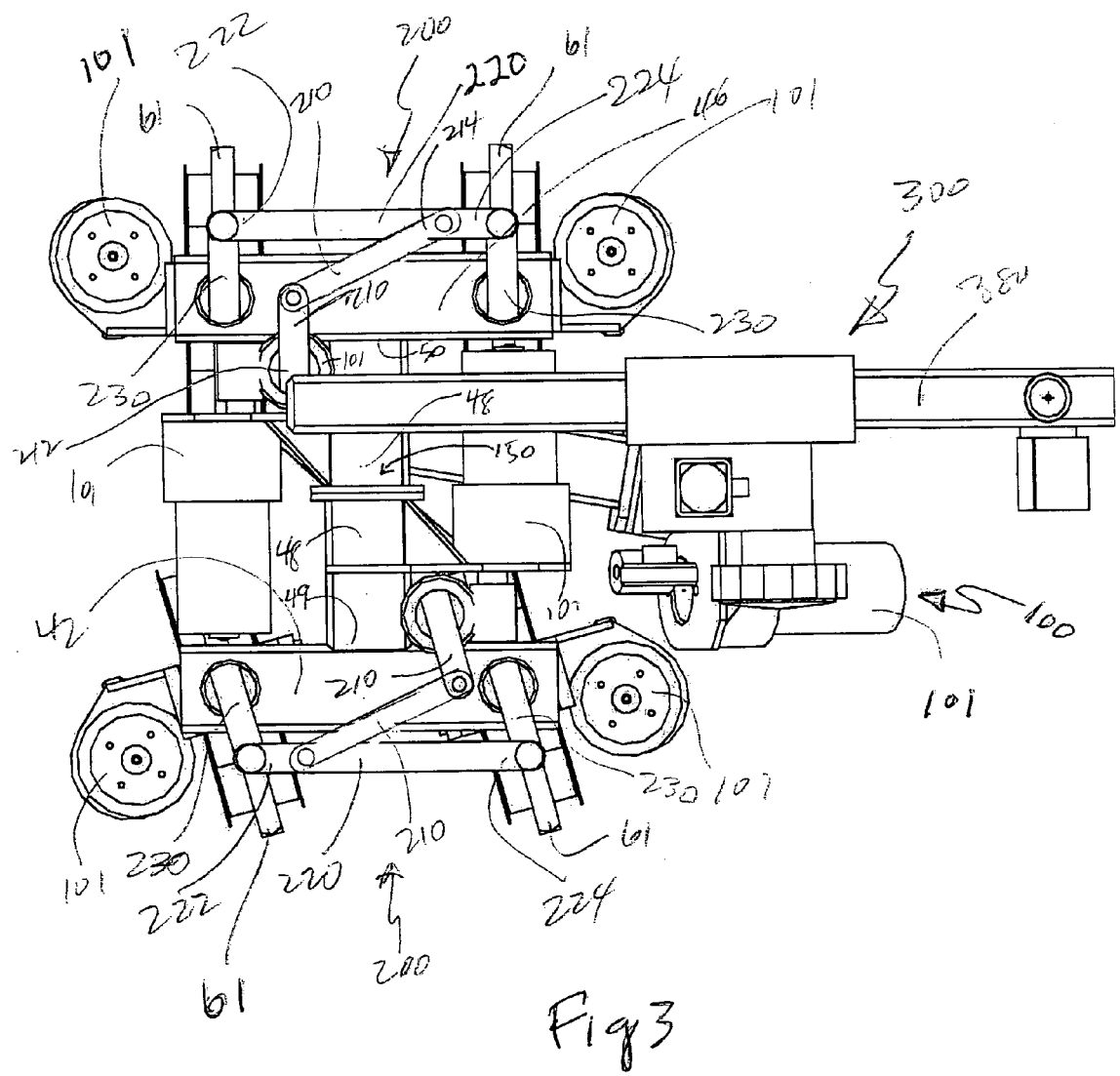
FIG. 3 is a top plan view of the steerable magnetic wheel carriage (1) illustrating the steering means (200) with radius arm (210), tie rod (220), tie rod first end (222), tie rod second end (224) and steering arm (230). Also seen is carriage frame means (40) with first frame member (42), second frame member (46), transverse frame member (48) and frame pivot (150). Also illustrated is attachment extension means (380) with drive power and transmission means (100) including motor means (101) for extension and retraction of the attachment extension means (380).
Figure 4:
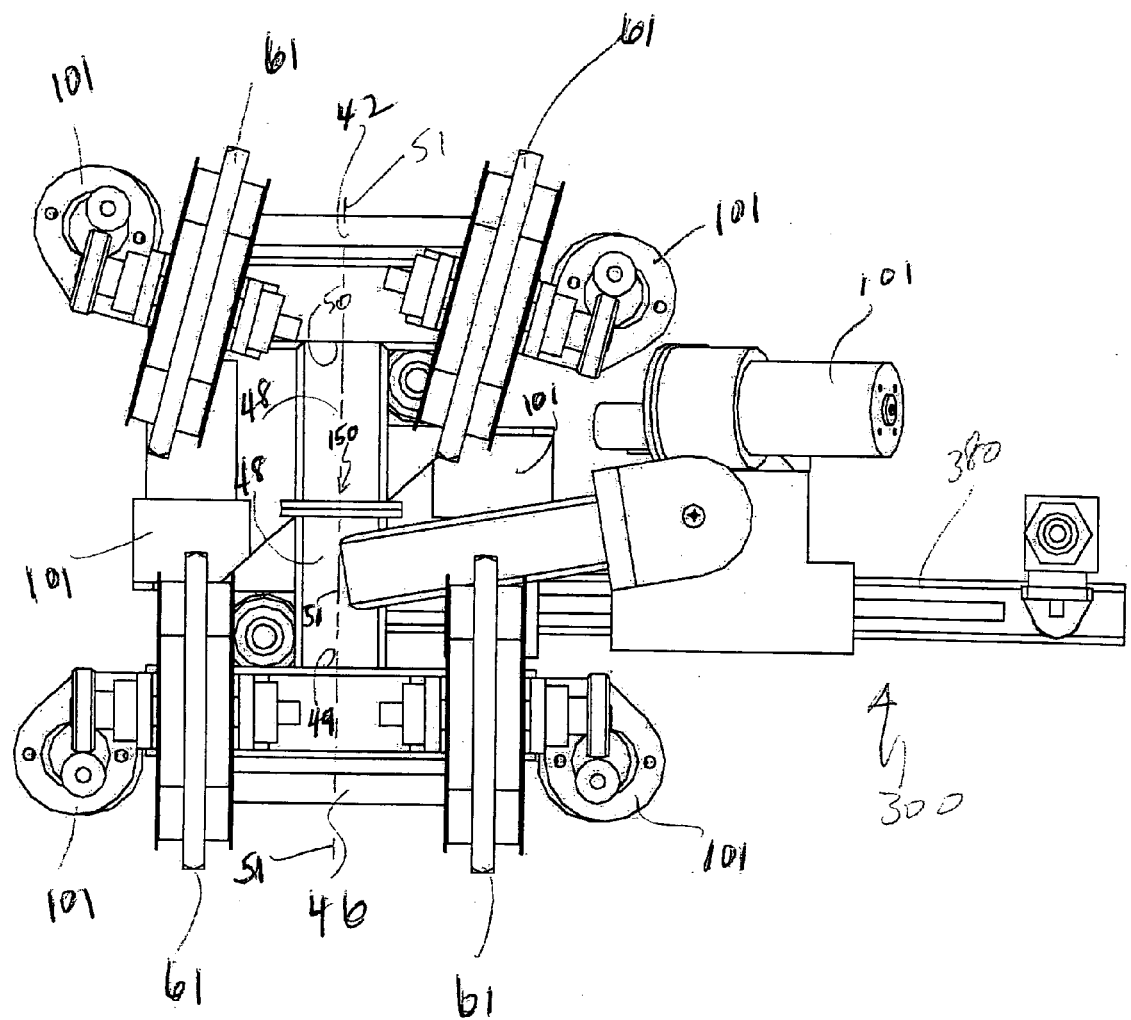
FIG. 4 is a bottom plan view depicting the carriage frame means (40) with first frame member (42), second frame member (46), transverse frame member (48), transverse frame member axis (51) and frame pivot (150).
Figure 4E:
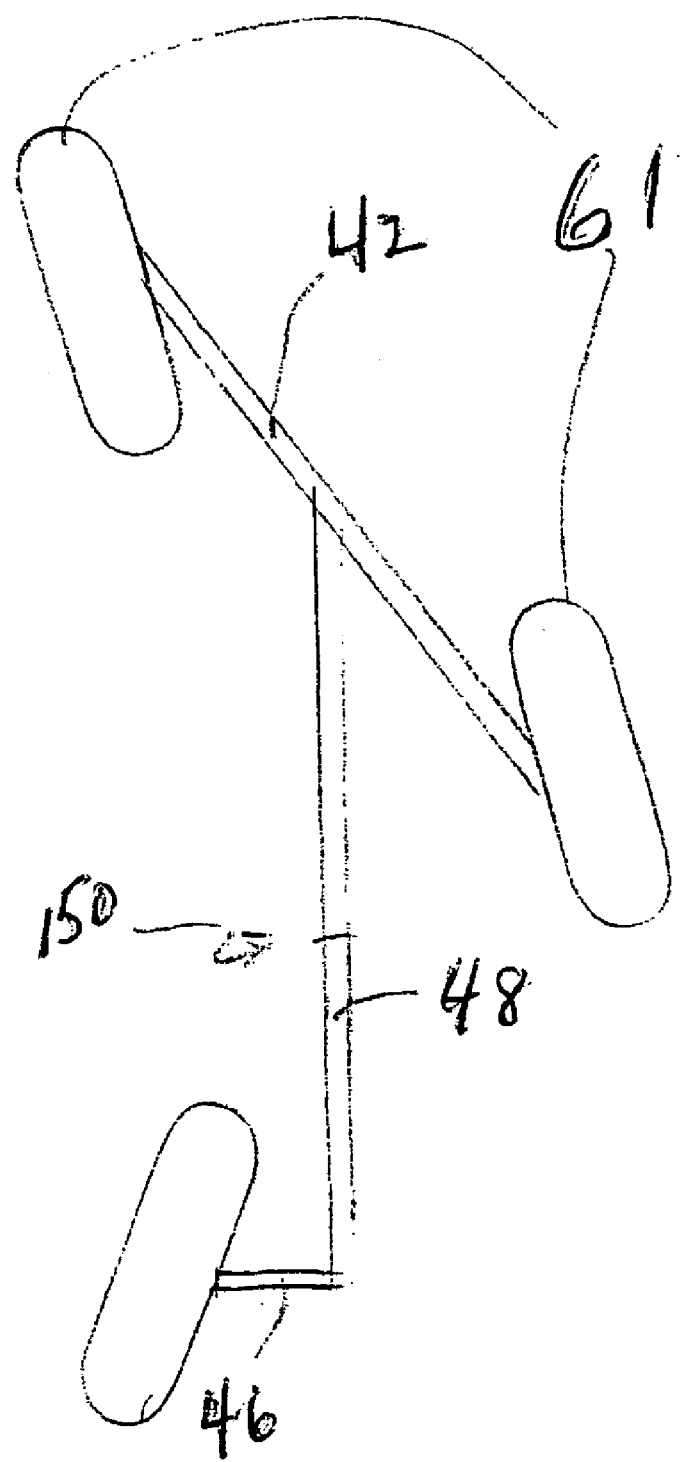
FIG. 4E is a schematic illustrating an alternative embodiment with at least one magnetic wheel (61) extends from at least one second frame means (46) and where an at least one first frame means (42) is not generally parallel to the at least one second frame means (46).

FIG. 3 illustrates the steering means (200) with radius arm (210), tie rod (220), tie rod first end (222), tie rod second end (224) and steering arm (230). In the preferred embodiment a radius arm (210) is comprised of at least two radius arm (210) links having a radius arm first end (212) and a radius arm second end (214); said radius arm links are rotatably interconnected by link connecting means. Where there are at least two magnetic wheels (61) extending from either the at least first frame means (42) or the at least second frame means (46), the radius arm first end (212) is rotatably affixed to a steering motor (101) with the radius arm second end (214) being rotatably affixed, by rotatable fixing means, the tie rod (220) intermediate the tie rod first end (222) and the tie rod second end (224). The tie rod (220) proximal the tie rod first end (222) is rotatably affixed by rotatable means to a steering arm (230) which is rotatably affixed by rotatable means to a rotatable shaft attachment means (56); The tie rod (220) proximal the tie rod second end (222) is rotatably affixed by rotatable means to a steering arm (230) which is rotatably affixed by rotatable means to a rotatable shaft attachment means (56).

At least one fixture attachment means (300) is rigidly affixed by frame affixing means to the carriage frame means (40). FIGS. 1, 2, 3, 4 and 8 depicts fixture attachment means (300) which receives, by rigid bracket affixing means at an at least one attachment extension means (380), comprised generally of an elongated tubular material, welding and cutting fixture means (320), camera and optical means (400) and other devices as may be desired by an operator of the carriage apparatus (1). In the preferred embodiment the at least one fixture attachment means (300) receiving welding and cutting fixture means (320) extends upwardly and outwardly from the at least one transverse frame means (48). In the preferred embodiment the at least one attachment extension means (380) is extended and retracted by motor means (61). In the preferred embodiment the at least one attachment extension means (380) may be rotated by a flexible joint (385) as seen in FIG. 8.

Camera and optical means (400) has a generally tubular camera case (420) with bracket camera mounting means (430), camera and circuit communication means (445) and camera illumination means (460) directed toward the surface (65) through a translucent cover (480).

Drive power and transmission means (100) is provided at each of the at least one magnetic wheels (61), with motor means (101) and motion transmission means (59) at each magnetic wheel (61), the fixture attachment means (300) and steering means (200). Motor mount means (105) affix by motor mounting affixing means, each motor relative to the pertinent magnetic wheel (61), the fixture attachment means (300) and the steering means (200).

Figure 2:
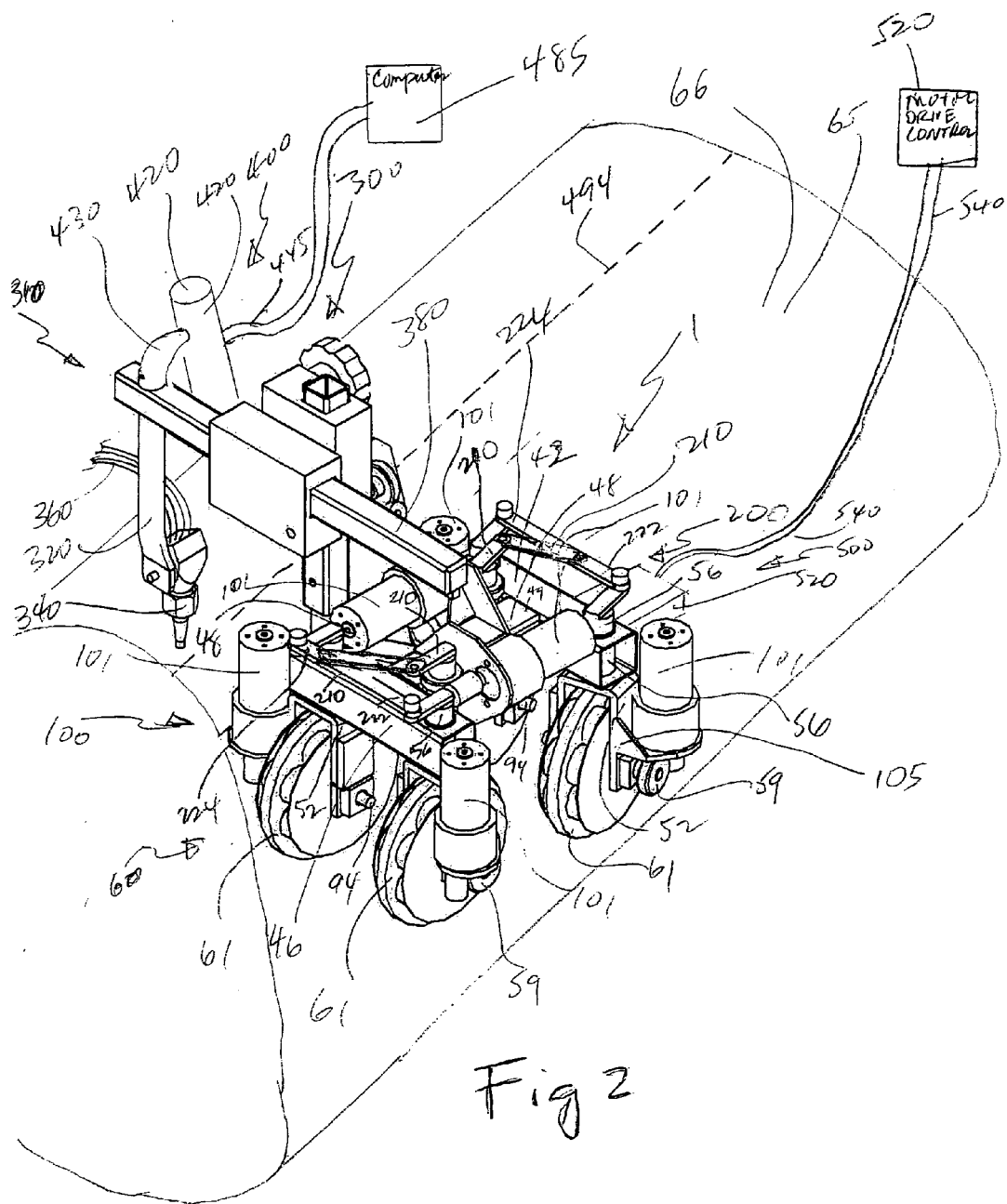
FIG. 2 is a rear perspective of the steerable magnetic wheel carriage (1) with fixture attachment means (300) showing carriage frame means (40), wheel frame (52) with shaft attachment means (56) and motion transmission means (59), magnetic wheel system (60) with magnetic wheels (61), wheel mounting means (94), drive power and transmi4ssion means (100) with motor means (101) at each magnetic wheel (61). Also depicted is steering means (200) having steering motor means (61) and fixture attachment means (300) receiving welding and cutting fixture means (320). Shown is camera and optical means (400) with camera case (420), camera mounting means (430), camera and circuit communication means (445) and reference mark (494) to be viewed by an at least one camera means (400). Also illustrated is motor drive control means (500) with motor drive control and instrumentation circuit means (520) and motor drive communication means (540). Also seen is a surface (65) shown here as a pipe (66).

FIG. 2 depicts is a motor drive control means (500) with motor drive control and instrumentation circuit means (520) and motor drive communication means (540). Motor drive control means (500) comprises control and communication to each of the motors (61) on the carriage apparatus (1). In the preferred embodiment at least two wheel frames (52) will extend from each of the at least first frame means (42) and the at least second frame means (46), with wheel frames (52) receiving at least one magnetic wheel (61).

In the preferred embodiment the at least one drive motor (101) for the at least one magnetic wheel (61) extending from the at least first frame means (42) and the at least one drive motor (101) for the at least one magnetic wheel extending from the at least second frame means (46), and where there are a plurality of drive motors (101) and a plurality of Magnetic wheels (61), independently receive drive and control commands allowing steering as depicted in FIGS. 4A, 4B, 4C, 4D and 4E.

In another embodiment the drive motor (101) for the at least one magnetic wheel (61) extending from the at least first frame means (42) proximal the welding and cutting fixture means (320) and drive motor (101) for the at least one magnetic wheel extending from the at least second frame means (46) proximal the welding and cutting fixture means (320) receive the same drive and control commands; the drive motor (101) for the at least one magnetic wheel (61) extending from the at least first frame means (42) distal from the welding and cutting fixture means (320) and drive motor (101) for the at least one magnetic wheel extending from the at least second frame means (46) distal from the welding and cutting fixture means (320) receive the same drive and control commands; the steering motor (101) for the steering control of the at least one magnetic wheel (61) at the at least one first frame member (42) receive drive and control commands independent from the drive and control commands for the steering motor (101) for the steering control of the at least one magnetic wheel (61) at the at least one second frame member (46). In the preferred embodiment the at least one attachment extension means (380) is extended and retracted by motor means (61) and controlled by drive and control commands from motor drive control means (500). Motor drive control and instrumentation circuit means (520) may be positioned at the carriage apparatus (1) or remotely from the carriage apparatus (1); and motor drive communication means (540) may be conveyed by electronic or other communication means including cabling, IR, RF or other communication, data and control means.

In the preferred embodiment, the camera means (400) comprises a camera case (420) which has an affixed camera mounting means (430) and which receives at least one camera and circuit (440), camera and circuit communication means (445) for communication with a computer, camera illumination means (460) with a translucent cover (480) between the camera and circuit (440) and the area viewed by the camera and circuit (440). Low cost and light weight are the motivating factors for the development of this simple camera means (400) and computer program (1001). Manual control of the carriage is greatly enhanced by providing visual feedback to an operator of carriage apparatus (1) location relative to a line or edge. Camera illumination means (460) of the viewing area allows for operation in varying lighting conditions. The at least one camera and circuit (440), camera and circuit communication means (445), camera illumination means (460) and translucent cover (480) are enclosed in the camera case (420) which is lightweight and protective. Image display is via PC processing software (490) which is custom software.

The camera case (420), in the preferred embodiment, is formed from a light weight aluminum housing with a clear plastic cover (480). The camera case (420) protects circuits, camera and illumination means located therein. The camera illumination means (460) is comprised, in the preferred embodiment, of high output LEDs placed in a typical ring lighting configuration and providing a minimum level of light for those dimly lit areas of a project such as the under or inside of a pipe (66). The camera and circuit communication means (445), in the preferred embodiment, provides an USB or similar computer interface.

Figure 5:
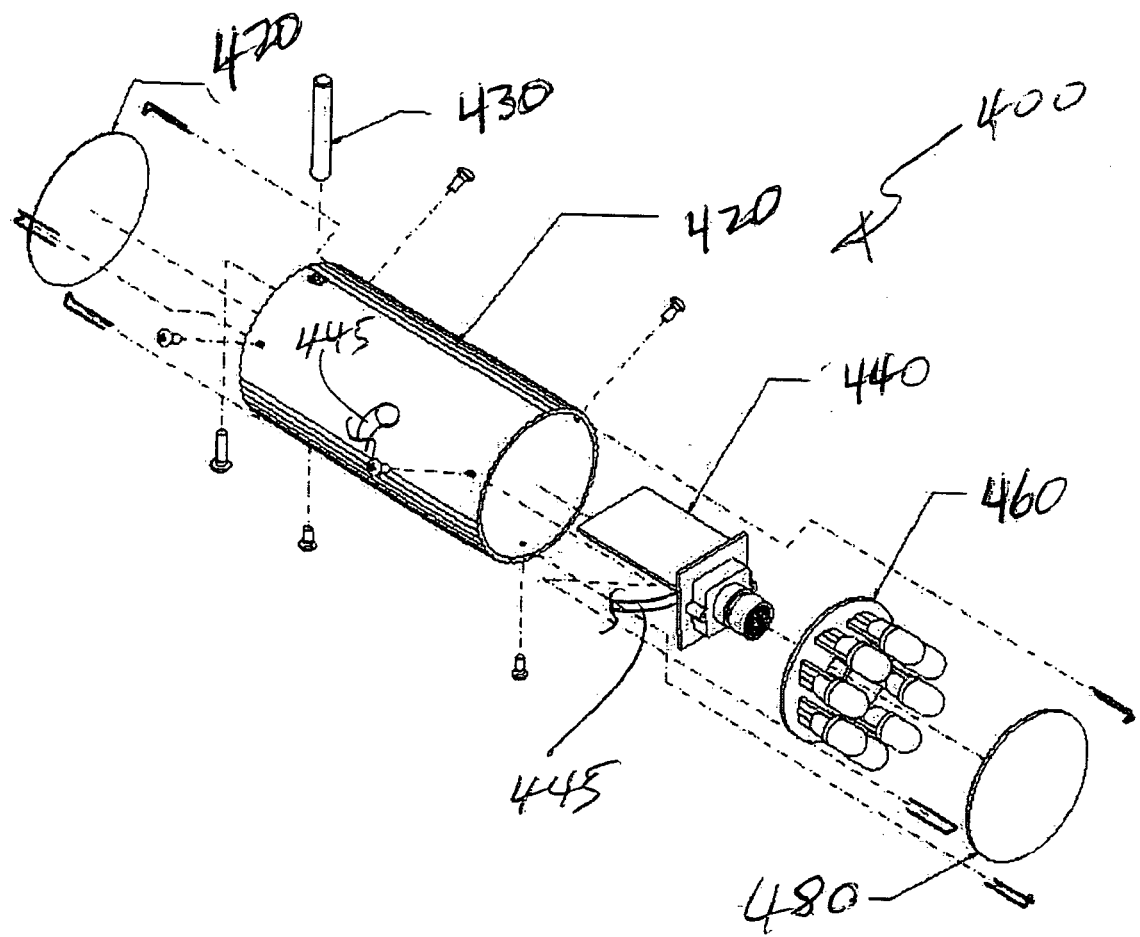
FIG. 5 is a schematic of carriage (1) camera means (400) with camera case (420), camera mounting means (430), camera and circuit (440), camera and circuit communication means (445), camera illumination means (460) and translucent cover (480).

An operator will view images from the camera means (400) on a computer screen with input received via a basic software interface. As seen in FIG. 5A, the program is started at Start (1200). Code begins with a basic preview image (1000) mode that displays an image in the image window. No image processing can be done until the image capture mode is started, at Start Capture (1100). Image capture (1300) allows pixel information to be read, modified, saved, and displayed. The captured image (1300) can be enhanced to optimize visual feedback to an operator or processed to provide digital feedback to automated control systems. Means of enhancement includes Flip file image in X-Axis (1320) and Flip file image in Y-Axis (1330).

Figure 5B:
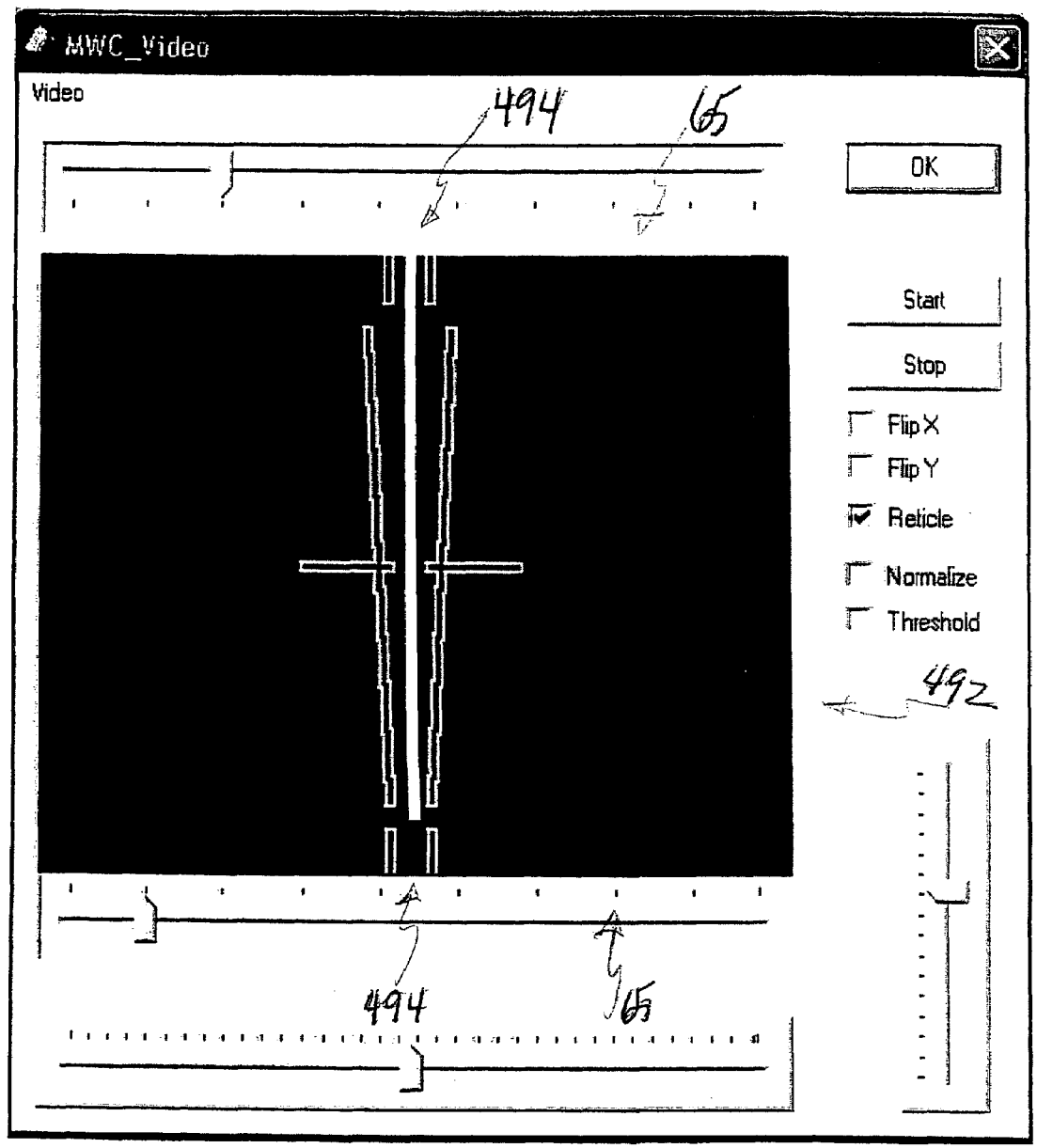
FIG. 5B is a screen shot of the reticule means (492) used as an operator guidance assist in guiding the carriage apparatus in following a reference line (494) on a surface (65).

A reticle (492), seen at FIG. 5B, may be displayed which is superimposed on the image at each captured image (1300). The camera means (400) may be focused on a mark or reference line (494), which has been applied to the surface (65) or the pipe (66), for operator guidance purposes. The reticle (492), appearing in the computer screen, frames the reference line (494). The reticle (492) enhancement is provided by Draw Black Reticle (1700) or Draw White Reticle (1600) at Display image (1500). The reticle set of reference marks assists an operator in manually guiding the carriage apparatus (1). Parameters that define the reticle width at the top and bottom of the image display and for the centering of the reticle within the image display can be set by the operator.

Two image enhancing tools are available for optimizing image tracking. Image normalization at Normalize Image Pixel (1800), which is stretching the darkest and lightest pixels of an image to the absolute black and white values and scaling the values between, improves resolution of targets in some cases. Setting a threshold value is selected by the operator. Converting image pixels below a threshold value to black and pixels at or above a threshold value to white at Perform Threshold Conversion (1900), creates a simplified target to track and can be used effectively in some cases. The image can be inverted, at Invert Image Pixel Data (1920), to make light pixels dark and dark pixels light prior to application of a threshold value at Perform Threshold Conversion (1900). The image is displayed at Display Image (1500). Image capture (1300) is repeated at a rate determined by the actual camera and computer capabilities. This can vary from approximately 1 frame every 5 seconds to approximately 30 frames per second. Image capture (1300) is continued until the operator chooses to stop the capture at Exit Capture (2000) or ends the program at Exit Program (2020).

Figure 6:
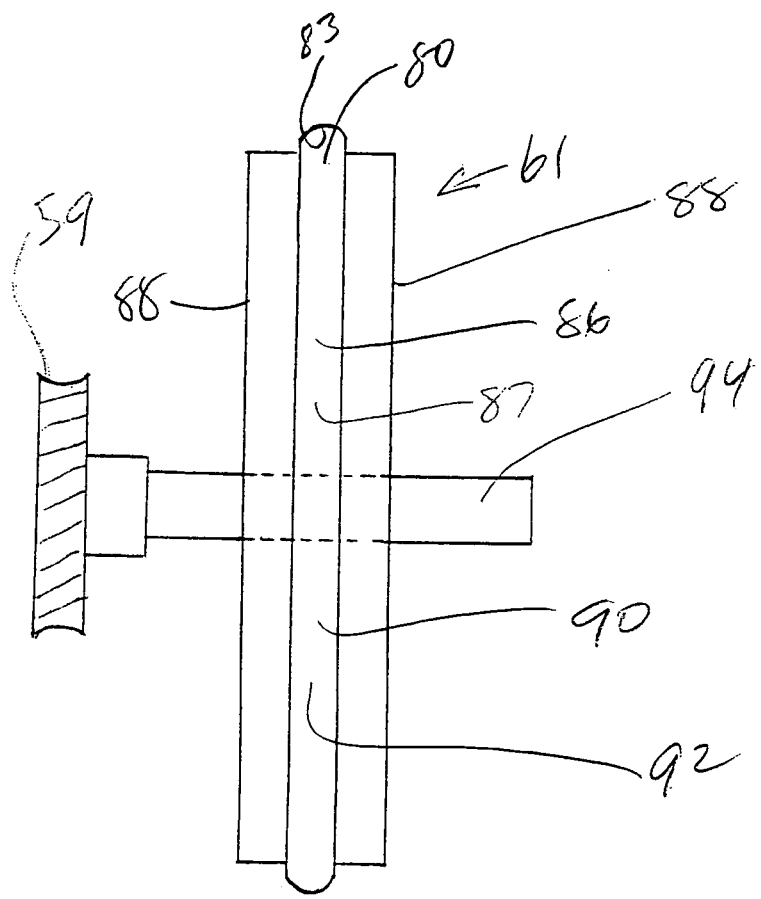
FIG. 6 is a front elevation of a magnetic wheel (60) with shaft (56) showing a middle plate (80) having a middle plate radius (86), outer plates (88), and contact surface (90) with a traction means (92).
Figure 7:
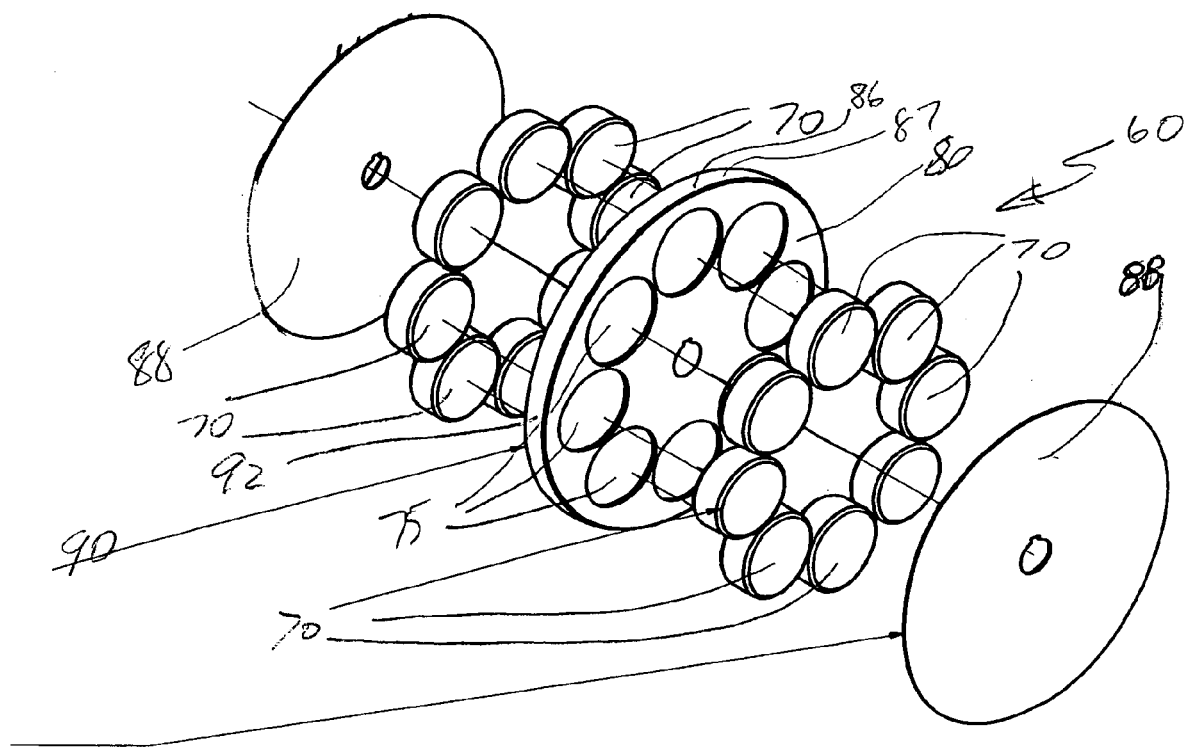
FIG. 7 is an exploded illustration of the magnetic wheel (60) showing rare earth magnets (70), recessed pockets (75) in a middle plate (80) having a middle plate radius (86). Also seen are outer plates (88), the middle plate contact surface (90) with traction means (92).

FIGS. 6 and 7 illustrates the preferred embodiment of the magnetic wheel (60) of this invention. The magnetic wheel (61) is affixed to the wheel frame (52) via an axle and wheel mounting means. The axle is rotated by power transmission means including gear means (59).

The magnetic wheel (61) is composed of at least one planar circular middle plate (80) having a middle plate perimeter (86) at a middle plate circumference (87); at least one magnet (70), and in the preferred embodiment a plurality of magnets (70) which, in the preferred embodiment are rare earth magnets (70), are received into generally circular recessions depicted as recessed pockets (75) on at least one side of the middle plate (80). The at least one magnet (70) is secured by magnet securing means, including but not limited to adhesives including epoxies, in a recessed pocket (75) In the preferred embodiment magnets (70) are received into recessed pockets (75) formed on both sides of the middle plate (80). At least one outer plate (88) having a center common with a center of middle plate (80) on each side of the middle plate (80). The at least one or plurality of magnets (70) intermediate the respective side of the middle plate (80) and each of the at least one outer plate (88). Said at least one outer plate (88) affixed by plate affixing means relative to the at least one middle plate (80). Plate affixing means includes adhesives including epoxies which retains the said at least one outer plate (88) in position relative to the at least one middle plate (80) and which protects the at least one or a plurality of magnets (70) from contamination.

The middle plate (80) at the perimeter (86) forming a contact surface (90) with traction means (92). The contact surface (90) of the middle plate (80) is the surface which will contact the pipe (66) or surface (65) upon which the carriage apparatus (1) will operate. The contact surface (90) may be knurled to provide traction and in the preferred embodiment will be knurled with double cut forming diamond shapes. Additionally the contact surface (90) may be hardened, preferably to a 50 to 55 Rockwell hardness and or coated with a traction means (92) to form a rough surface. In the preferred embodiment the a traction means (92) coating is with a flame sprayed metal or alloy powder or flame sprayed carbide hardface including but not limited to nickel base with tungsten carbide. Traction means (92) provides protection for the diamond points on the knurled contact surface (90).

Figure 6A:
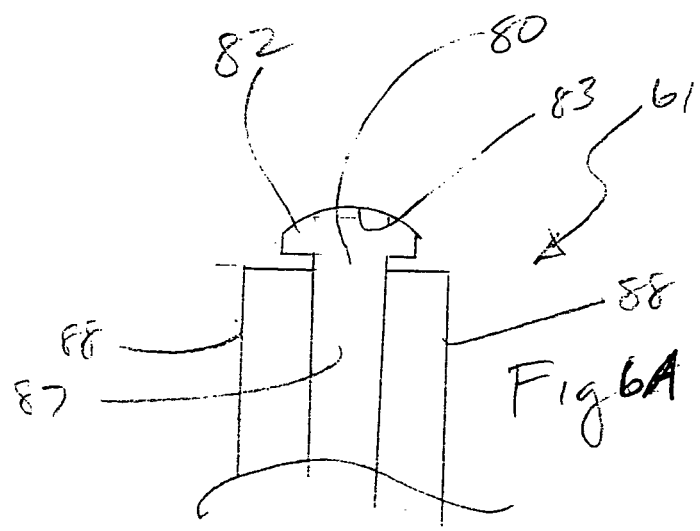
FIG. 6A illustrates a radiused flange (82) having a radius (83) at the middle plate perimeter (86).

The contact surface (90) at the perimeter (86) may be flat but in the preferred embodiment will have a radius (83) to assist the carriage apparatus (1) in retaining magnetic attraction with a surface (65), which may have irregularities or, in negotiating the curvature of a pipe (66). In the preferred embodiment of the middle plate (80), the contact surface (90) at the perimeter will have a radius of a minimum of (plate thickness)/2, i.e., for a ⅜" middle plate (80) the minimum radius will be 3/16". The effective contact surface (90) may be increased by the addition of a radiused flange (82) having a radius (83) at the perimeter (86) as seen in FIG. 6A.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A steerable magnetic wheel carriage apparatus (1) comprising:
   a. a frame means (40), for support of wheel frames, wheels and axles;
   b. at least one wheel frame means (52), for rotatably receiving or mounting wheels, rotatably affixed to the frame means (40), for support of wheel frames, wheels and axles, and extending therefrom toward a surface (65);
   c. the at least one wheel frame means (52) receiving at least one magnetic wheel (61) rotatably affixed thereto by wheel mounting means (94) for rotatable attachment of wheels;
   d. steering means (200), for steering or turning the carriage, rotatably interconnected to the at least one wheel frame means;
   e. drive power and transmission means (100), for rotation of wheels, is interconnected to at least one magnetic wheel (61), with motor means (101) and motion transmission means (59) the at least one magnetic wheel (61);
   f. at least one fixture attachment means (300), for attaching devices to the carriage frame, is rigidly affixed by frame affixing means to the carriage frame means (40); at least one fixture means (310) affixed to the at least one fixture attachment means (300), for attaching devices to the carriage frame,; the at least one fixture means (310) performing a function relative to the surface (65);
   g. camera and optical means (400), for viewing and positioning the carriage, directed toward the surface (65) for operator viewing and control of drive power and transmission means (100).

2. The steerable magnetic wheel carriage of claim 1 further comprising:
   a. the frame means (40) comprised of at least one elongated first frame member (42) having at least one wheel frame means (52) extending orthogonally therefrom toward the surface (65); the at least one wheel frame means (52), for rotatably receiving or mounting wheels, receiving at least one magnetic wheel (61) rotatably affixed thereto by wheel mounting means (94) for rotatable attachment of wheels;
   b. least one elongated second frame member (46) having at least one wheel frame means (52) extending orthogonally therefrom toward the surface (65); the at least one wheel frame means (52) receiving at least one magnetic wheel (61) rotatably affixed thereto by wheel mounting means (94);
   c. at least one elongated transverse frame member (48) having a transverse frame member first end (49) and a transverse frame member second end (50) and frame pivot (150); a transverse frame member axis (51) from the transverse frame member first end (49) to the transverse frame member second end (50); the at least one first frame member (42) is rigidly affixed by frame interconnection means to the transverse frame member first end (49); the at least one second frame member (46) is rigidly affixed by frame interconnection means to the transverse frame member second end (50);
   d. the orientation of the at least one first frame member (42) relative to the at least one second frame member (46) is such that the at least one wheel frame means (52) with at least one magnetic wheel (61) extending from the at least one first frame member (42) and or from the at least one second frame member (46) remains in contact with the surface (65) and is steerable during operation of the invention;
   e. camera and optical means (400), for viewing and positioning the carriage, directed toward the surface (65) for operator viewing and control of drive power and transmission means (100), for rotation of wheels, is computer controlled by a computer program.

3. The steerable magnetic wheel carriage of claim 2 further comprising:
   a. the said at least one first frame member (42) and the at least one second frame member (46) are interconnected to the at least one transverse frame member (48) such that they are generally parallel to each other;
   b. wheel mounting means (94) are comprised of axle means (94);
   c. the at least one elongated transverse frame member (48) has a frame pivot means (150) intermediate the said transverse frame member first end (49) and the transverse frame member second end (50); the transverse frame member first end (49) and hence the at least one first frame member (42) is pivotally related, about the axis (51), to the transverse frame member second end (50) and to the at least one second frame member (46), as the carriage apparatus (1) maneuvers over irregular surfaces (65) and or the curvature of a pipe (66) thereby maintaining continued contact between the magnetic wheels (61), extending from the frame means (40) toward the surface (65), and the surface (65);
   d. the at least one magnetic wheel (61) extending from each of the at least one first frame member (42) and from the at least one second frame member (46) extend generally orthogonally therefrom toward the surface;
   e. the at least one magnetic wheel (61) is composed of at least one planar circular middle plate (80) having a middle plate perimeter (86) at a middle plate circumference (87); at least one magnet (70) is received into at least one recessed pocket (75) on at least one side of the middle plate (80); the at least one magnet (70) is secured by magnet securing means in the at least one recessed pocket (75); at least one outer plate (88) having a center common with a center of middle plate (80) fixedly placed by plate fixing means on each side of the middle plate (80); the middle plate (80) at the perimeter (86) forming a contact surface (90) with fraction means (92) for contact with the surface (65); the contact surface (90) at the perimeter (86) may be flat or radisused (83).

4. The steerable magnetic wheel carriage of claim 3 further comprising:
   a. the frame pivot means (150) is comprised of a frame pivot first surface (152) bearing on a frame pivot second surface (154) where the frame pivot first surface (152) and pivot second surface (154) are rotatable interconnected by frame pivot connecting shaft means (156) aligned with the axis (51);
   b. at least two wheel frame means (52), rotatably receiving or mounting wheels, presenting at least one magnetic wheel (61) each are rotatably affixed to at least one of the at least one first frame member (42) or the at least one second frame member (46) such that there will be at least three magnetic wheels (61) extending from the frame means (40) for contact with the surface (65) or pipe (66);
   c. the at least one magnet (70) is a plurality of magnets (70); the recessed pockets (75) are generally circular recessions; magnetic securing means including but not limited to adhesives including epoxies; the plurality of magnets (70) are received into a plurality of recessed pockets (75) formed on both sides of the middle plate(80); the plurality of magnets (70) are intermediate the respective side of the middle plate (80) and each of the at least one outer plates (88); plate fixing means includes adhesives including epoxies; the contact surface (90) is knurled; traction means (92) provides protection of the points on the knurled contact surface (90);
   d. the contact surface (90) has a radius (83).

5. The steerable magnetic wheel carriage of claim 4 further comprising:
   a. frame means (40), for support of wheel frames, wheels and axles, is constructed of rigid materials including metals and composite materials;
   b. the magnets are rare earth magnets (70); the contact surface (90) is knurled with double cut forming diamond shapes; the contact surface (90) is hardened, to a 50 to 55 Rockwell hardness and or coated with a fraction means (92) forming a rough surface where said traction means (92) is with a flame sprayed metal or alloy powder or flame sprayed carbide hardface including but not limited to nickel base with tungsten carbide;
   c. the contact surface (90) at the perimeter will have a radius of a minimum of a (middle plate thickness)/2;
   d. said at least one outer plate (88) affixed by plate affixing means relative to the at least one middle plate ((80); plate affixing means comprised of adhesives including epoxies which retains the said at least one outer plate (88) in position relative to the at least one middle plate (80) and which protects the at least one or a plurality of magnets (70) from contamination.

6. The steerable magnetic wheel carriage of claim 5 further comprising:
   a. rigid materials for frame means (40) comprised of tubular materials;
   b. frame interconnection means comprised of welding and or other mechanical affixing means and by adhesives including epoxies;
   c. wheel frames (52) are rotatably interconnected with the at least one first frame member (42) and the at least one second frame member (46) by rotatable shaft attachment means (56) composed of a shaft received by bushing and bearing means positioned in the at least one first frame member (42) and in the at least one second frame member (46);
   d. the steering moans (200), for steering or turning the carriage, comprised of an radius arm (210) affixed by affixing means and turned or rotated by at least one drive and transmission means (100) and rotatably affixed by rotatable affixing means to a connecting or tie rod (220); the tie rod (220) having a tie rod first end (222) and tie rod second end (224) and a steering arm (230) rotatably affixed by affixing means proximal each of the tie rod first end (222) and tie rod second end (224); each of said steering arms (230) affixed by affixing means to at least one wheel frame (52);
   e. the effective contact surface (90) is increased by the addition of a radiused flange (82) having a radius (83) at the perimeter (86).

7. The steerable magnetic wheel carriage of claim 6 further comprising:
   a. the radius arm (210) is comprised of at least two radius arm (210) links rotatably interconnected by rotatable means having a radius arm first end (212) and a radius arm second end (214); said radius aim links (210) are rotatably interconnected by link connecting means.

8. The steerable magnetic wheel carriage of claim 7 further comprising:
   a. where there are at least two magnetic wheels (61) extending from either the at least first frame means (42) or the at least second frame means (46), and where any of said at least two magnetic wheels (61) are to be steered, the radius arm first end (212) is rotatably affixed to a steering motor (101) at each of the said at least first frame means (42) or the at least second frame means (46) where there are at least two magnetic wheels (61) extending therefrom; the radius arm second end (214) being rotatably affixed, by rotatable fixing means to the tie rod (220) intermediate the tie rod first end (222) and the tie rod second end (224); the tie rod (220) proximal the tie rod first end (222) is rotatably affixed by rotatable means to a steering ann (230) which is rotatably affixed by rotatable means to a rotatable shaft attachment means (56); the tie rod (220) proximal the tie rod second end (222) is rotatably affixed by rotatable means to a steering arm (230) which is rotatably affixed by rotatable means to a rotatable shall attachment means (56);
   b. the at least one attachment means (300) is comprised of bracket means securing elongated solid or tubular attachment extension means (380) to the carriage apparatus (1); fixture attachment means (300), for attaching devices to the carriage frame, securely receives at least one fixture means (310) including welding and cutting fixture means (320), camera and optical means (400) and other devices as may be desired by an operator of the carnage apparatus (1).

9. The steerable magnetic wheel carriage of claim 8 further comprising:
   a. the at least one fixture attachment means (300), for attaching devices to the carriage frame, extends upwardly and outwardly from the at least one transverse frame means (48); the at least one attachment extension means (380) is extended and retracted by motor means (101);
   b. camera and optical means (400), for viewing and positioning the carriage, has a generally tubular camera case (420) with bracket camera mounting means (430), the camera case (420) containing camera and circuit communication means (445) and camera illumination means (460) directed toward the surface (65);

c. drive power and transmission means (100), for rotation of wheels, having with motor means (101) and motion transmission means (59), is power and transmission interconnected at each magnetic wheel (61) to be steered or at each of the at least one first frame members (42) or the at least one second frame members (46) where at least one magnetic wheel (61) is to be steered, at the fixture attachment means (300) and at the steering means (200); motor mount means (105) affixed by motor mounting affixing means at each motor relative to the said magnetic wheel (61), the fixture attachment means (300) and or the steering means (200);

d. drive power and transmission means (100) and motor means (101) controlled by a motor drive control means (500).

10. The steerable magnetic wheel carriage of claim 9 further comprising:

a. motor drive control means (500) comprised of motor drive control and instrumentation circuit means (520) and motor drive communication means (540);

b. and camera illumination means (460) directed toward the surface (65) through a translucent cover (480).

11. The steerable magnetic wheel carriage of claim 10 further comprising:

a. motor drive control and instrumentation circuit means (520) comprised of variable voltage input to each of said drive power and transmission means (100), for rotation of wheels, for each of said motors (61); motor drive communication means (540) by electronic means via cable or wire, IR and or RF;

b. motor drive control and instrumentation circuit means (520) may be positioned at the carriage apparatus (1) or remotely from the carriage apparatus (1);

c. said camera and circuit communication means (445) is in electronic communication with a computer controlled by a computer program (1001); said camera and optical means (400) viewing and displaying the surface (65) view at the computer having a computer screen; the area viewed by the camera and circuit (440) and displayed at the computer screen provides visual information for operator control of the steering of the carriage apparatus (1) by providing visual feedback of a reticle means (492) relative to a reference line (494) on the surface (65);

d. the camera case (420) is formed from light weight rigid material including metals and composite materials; the camera illumination means (460) is comprised of high output LEDs;

e. the camera and circuit communication means (445) is in electronic communications with a computer (485) having a storage device, a processor connected to the storage device with the storage device storing a computer program (1001) for controlling the processor;

f. the computer (485) with processor operative with the computer program (1001) to display images from the camera means (400) on the computer screen;

g. the computer program (1001) is started at Start (1200); code begins with receiving of a basic preview image (1000) mode that displays an image on the computer screen; starting image capture mode, at Start Capture (1 100), commences image processing; reading, modifying, saving, and displaying of pixel information occurs at Image capture (1300); enhancement, to optimize visual feedback to an operator or processed to provide digital feedback to automated control systems, occurs at captured image (1300) by enhancement means including Flip file image in X-Axis (1320), Flip file image in Y-Axis (1330); reticle means (492), is superimposed on the image at each captured image (1300) where the camera means (400) is focused on a reference line (494) which has been applied to the surface (65) for operator guidance purposes; the reticle means (492), appearing in the computer screen and frames the reference line (494); the reticle means (492) enhancement is provided by Draw Black Reticle (1700) or Draw White Reticle (1600) at Display image (1500); reticle means (492) adjustment that define the reticle means (492) width at the top and bottom of the image display and for the centering of the reticle means (492) within the image display are operator controlled;

h. computer (1001) screen image enhancing tools for optimizing image tracking comprise Image normalization at Normalize Image Pixel (1800), which comprises stretching the darkest and lightest pixels of an image to the absolute black and white values and scaling the values between, improves resolution of targets in some cases; a threshold value is selected for converting image pixels below the threshold value to black and pixels at or above the threshold value to white at Perform Threshold Conversion (1900) thereby creating a simplified target for operator tracking; image inversion, at Invert Image Pixel Data (1920), makes light pixels dark and dark pixels light prior to application of the threshold value at Perform Threshold Conversion (1900); image display occurs at Display image (1500); image capture (1300) is repeated at a rate determined by the camera and computer capabilities which can vary from approximately 1 frame every 5 seconds to approximately 30 frames per second; Image capture (1300) is continued until the operator choice to stop the capture at Exit Capture (2000) or when the operator ends the program at Exit Program (2020).

12. The steerable magnetic wheel carriage of claim 11 further comprising:

a. each of the at least one drive motor (101) for each of the at least one magnetic wheels (61) extending from the at least first frame member (42) and the at least second frame member (46) independently receive motor drive communication means (540);

b. the at least one attachment extension means (380) is extended and retracted by motor means (61) and controlled by drive and control commands from motor drive control means (500); a flexible joint (385) intermediate the frame means (40) and the at least one attachment extension means (380);

c. the camera illumination means (460) is placed in a ring lighting configuration.

13. The steerable magnetic wheel carriage of claim 12 further comprising:

a. the drive motor (101) for the at least one magnetic wheel (61) extending from the at least first frame means (42) proximal the welding and cutting fixture metins (320) and drive motor (101) for the at least one magnetic wheel extending from the at least second frame means (46) proximal the welding and cutting fixture means (320) receive the game drive and control commands; the drive motor (101) for the at least one magnetic wheel (61) extending from the at least first frame means (42) distal from the welding and cutting fixture means (320) and drive motor (101) for the at least one magnetic wheel extending from the at least second frame means (46) distal from the welding and cutting fixture means (320) receive the same drive and control commands.

14. The steerable magnetic wheel carriage of claim 13 further comprising:
 a. the steering motor (101) for the steering control of the at least one magnetic wheel (61) at the at least one first frame member (42) receive drive and control commands independent from the dive and control commands for the steering motor (101) for the steering control of the at least one magnetic wheel (61) at the at least one second frame member (46).

* * * * *